Figure 1:
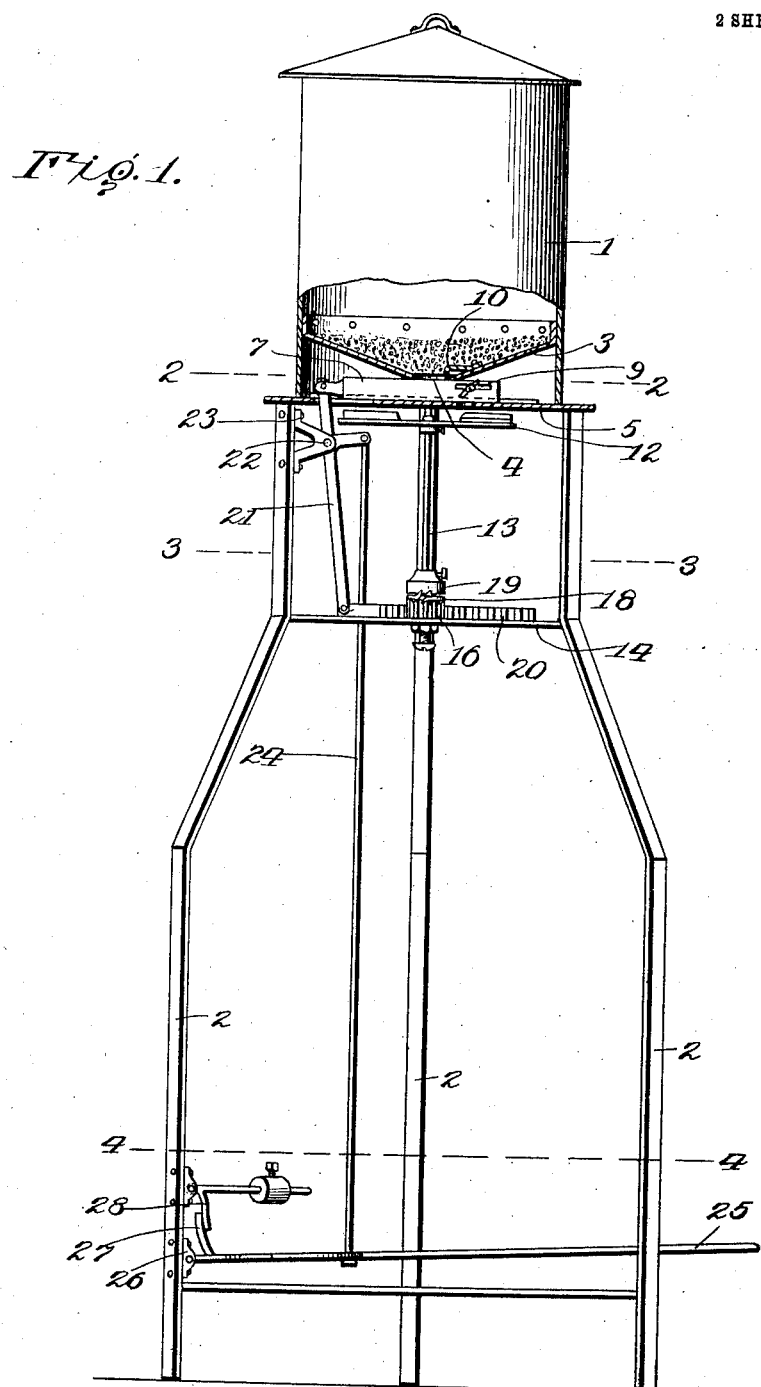

W. A. KRAXBERGER & H. J. LAKER.
AUTOMATIC POULTRY FEEDER.
APPLICATION FILED FEB. 11, 1911.

1,016,637.

Patented Feb. 6, 1912.
2 SHEETS—SHEET 1.

Witnesses
W. N. Woodson
Jeana M. Fallin

Inventors
William A. Kraxberger
and Henry J. Laker
By
Attorneys.

COLUMBIA PLANOGRAPH CO., WASHINGTON, D. C.

W. A. KRAXBERGER & H. J. LAKER.
AUTOMATIC POULTRY FEEDER.
APPLICATION FILED FEB. 11, 1911.
1,016,637.
Patented Feb. 6, 1912.
2 SHEETS—SHEET 2.
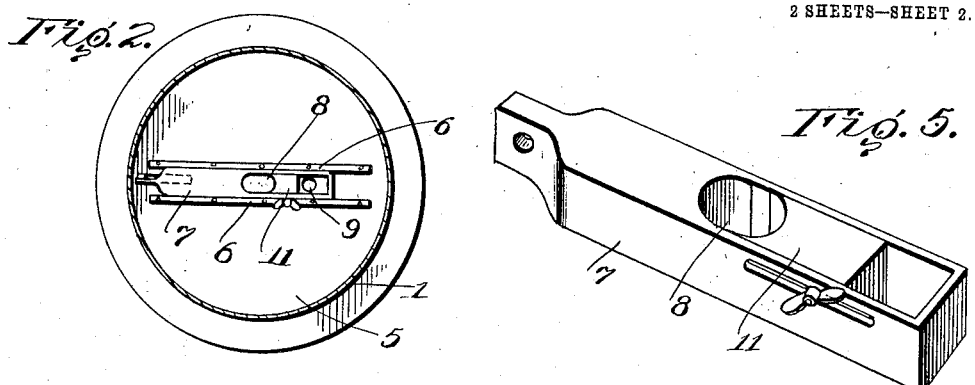
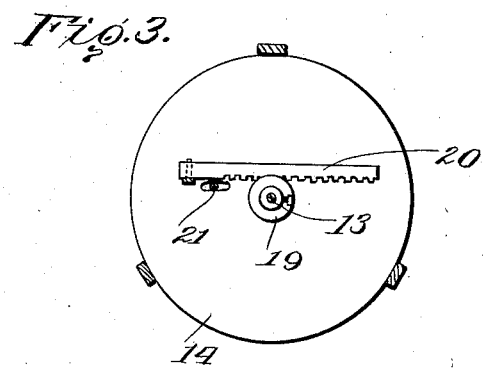
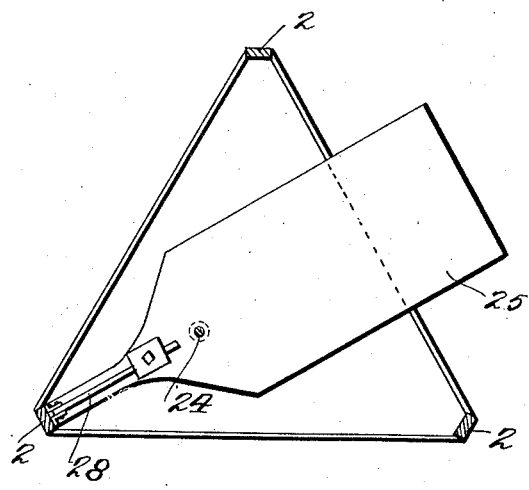
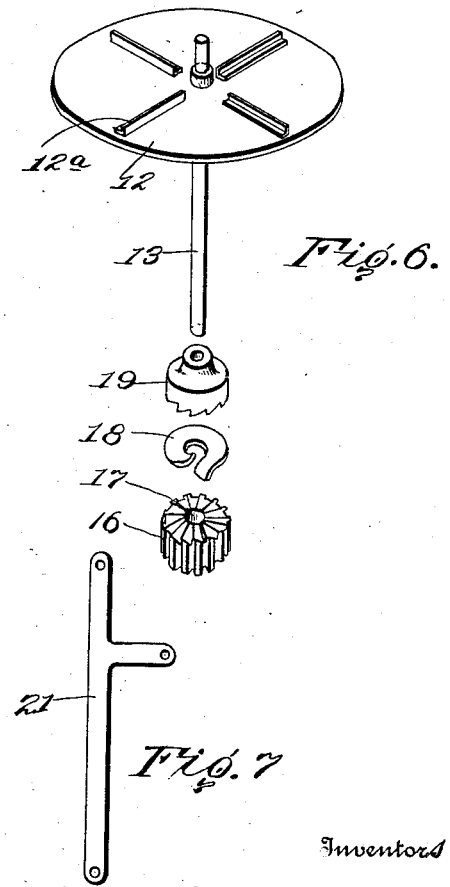
Witnesses
Inventors
William A. Kraxberger
and Henry J. Laker
By 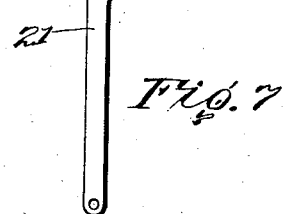, Attorneys.

UNITED STATES PATENT OFFICE.

WILLIAM A. KRAXBERGER AND HENRY J. LAKER, OF DALTON, MISSOURI.

AUTOMATIC POULTRY-FEEDER.

1,016,637. Specification of Letters Patent. Patented Feb. 6, 1912.

Application filed February 11, 1911. Serial No. 608,066.

*To all whom it may concern:*

Be it known that we, WILLIAM A. KRAXBERGER and HENRY J. LAKER, citizens of the United States, residing at Dalton, in the county of Chariton and State of Missouri, have invented certain new and useful Improvements in Automatic Poultry-Feeders, of which the following is a specification.

This invention comprehends certain new and useful improvements in poultry feeders, and the invention has for its primary object an improved construction of device of this character which will be simple in construction and efficient and practically automatic in its action, the feeding devices being operated by the fowls themselves as they hop or step upon a tilting platform comprising part of the apparatus.

The invention also has for its object an automatic poultry feeder which at every operation will feed only a predetermined amount of the grain or other food, and which will automatically and effectively distribute or scatter the grain as the same is fed from the storage receptacle.

A further object of the invention is a food distributing device, and improved actuating means therefor, the distributing device being preferably in the form of a revoluble disk and being so mounted and actuated that it may continue to rotate by its own momentum so as to effectively scatter the grain or the like, after the actuating mechanism has come to a standstill. And the invention also aims to simplify and otherwise generally improve this class of devices so as to render them more useful and commercially desirable.

With these and other objects in view as will more fully appear as the description proceeds, the invention consists in certain constructions, arrangements and combinations of the parts that we shall hereinafter fully describe and claim.

For a full understanding of the invention, reference is to be had to the following description and accompanying drawings, in which:

Figure 1 is a vertical longitudinal sectional view of our improved automatic poultry feeder, parts being shown in side elevation and some in section. Fig. 2 is a horizontal sectional view, the section being taken approximately on the line 2—2 of Fig. 1; Fig. 3 is a similar view on the line 3—3 of Fig. 1; Fig. 4 is a horizontal section on the line 4—4 of Fig. 1; Fig. 5 is a detail perspective view of the feed controlling slide employed; Fig. 6 illustrates some of the details in perspective; and, Fig. 7 is a detail view of an actuating lever employed.

Corresponding and like parts are referred to in the following description and indicated in all the views of the drawings by the same reference characters.

The storage receptacle 1 of our improved automatic poultry feeder may be of any desired size, design and construction and supported in any desired way, preferably in an elevated position, upon legs or standards 2.

The bottom 3 of the storage receptacle or hopper 1 preferably slopes toward the center, as shown, where it is provided with a mouth or discharge orifice 4 leading to a plate or disk 5 which forms the top of the framework and which directly supports the hopper or receptacle 1. The plate 5 is provided on its upper surface with guides 6 arranged parallel to each other in laterally spaced relation, and a slide 7 is mounted to reciprocate between the guides 6, the slide being formed with a perforation 8 adapted to alternately register with the orifices 4 and aperture 9 which is formed in the plate 5. Preferably, the hopper bottom 3 has a scraper plate 10 secured to it, so as to yieldingly bear down upon the upper face of the slide 7. Preferably, the slide 7 carries a feed regulating section 11 adjustably mounted thereon and controlled by a set screw, so that the size of the opening 8 may be varied to control the amount of grain to be deposited at each actuation of the slide.

A horizontally disposed revoluble disk 12 is mounted underneath the plate 5 and is designed to receive the grain as it is fed through the aperture 9, the said disk 12 which operates as a distributing or scattering device being mounted upon a vertically disposed shaft 13 journaled in the plate 5 and at its lower end in a support 14 connected to the legs 2. A spur pinion 16 is mounted on the shaft 13, said pinion being notched, as indicated at 17, so as to engage the split washer 18, at the same time catching the ratchet clutch collar 19 which is secured to the shaft 13. A rack bar 20 meshes with the pinion 16, said rack bar being mounted on the support 14 and being secured at one end to the downwardly extending arm of a three-arm lever 21 fulcrumed intermediate of its ends, as at 22, on a bracket 23. The upwardly projecting arm of this lever is pivotally connected to one end of the slide 7, as shown, while the remaining arm projects inwardly and is connected to the upper end of a link rod 24. The lower end of this link rod is connected to a treadle or platform 25 pivoted at one end to a casting 26, and arranged to be held in relatively elevated position by an upwardly projecting finger 27 designed for engagement with a weight actuated catch or trigger 28.

From the foregoing description in connection with the accompanying drawings, the operation of our improved poultry feeder will be apparent.

In the practical use of the device, when a fowl steps upon the tiltable platform 25, the same will be depressed, which will pull downwardly upon the link rod 24 and rock the three-arm lever 21. This actuation of said lever will manifestly move the slide in a direction to effect the registry of the pocket or opening 8 thereof with the opening 9, whereupon the grain or the like will be permitted to drop upon the scattering disk 12 which is simultaneously caused to rotate by the movement of the rack bar 20, which is in meshing engagement with the pinion 16 and the connection between said pinion and the clutch collar 19 that is secured to the shaft 13. Obviously, owing to the clutch connection between the pinion and the shaft, the disk 12 will continue to rotate by its own momentum and thus effectively scatter the grain, even after the pinion 16 has come to a standstill. When the fowl steps off the platform 25, the weighted latch arm 28 will be permitted to act to again raise the platform to its inoperative position and at the same time bring the other parts back to their initial positions, the clutch connection between the pinion 16 and the shaft 13 permitting the pinion to be reversed without imparting any reverse movement to the disk 12. Preferably, the disk 12 is provided with radially disposed scattering wings 12ª.

While the accompanying drawings illustrate what we believe to be the preferred form of our invention, it is to be understood that the invention is not limited thereto, as various changes may be made in the construction, arrangement and proportion of the parts without departing from the scope of the invention as defined in the appended claims.

Having thus described the invention, what is claimed as new is:

1. In a poultry feeder, the combination of a storage receptacle for grain and the like, said receptacle being provided with a discharge opening, means for controlling said opening, a revoluble disk supported underneath the opening, and means for operating the opening controlling means and imparting a free rotary movement to the disk, whereby to permit the disk to continue to run by its own momentum after actuation by the slide.

2. In a poultry feeder, the combination of a storage receptacle for grain and the like, said receptacle being provided with a discharge opening, a slide controlling said opening, a revoluble disk supported underneath the opening, and means for simultaneously operating said slide and imparting a free rotatable movement to the disk, whereby to permit the disk to continue to run by its own momentum after actuation by the slide.

3. A poultry feeder, embodying a storage receptacle for grain or the like, the receptacle being provided with a discharge opening, a feed slide operating underneath the opening, a revoluble disk mounted underneath the slide and adapted to receive the material therefrom, a shaft on which the disk is mounted, a pinion mounted on said shaft and arranged for a clutch connection therewith, a rack bar meshing with said pinion, a lever connected to the slide and to the rack bar for the simultaneous reciprocation of the two, and means for moving said lever.

4. A poultry feeder, embodying a storage receptacle for grain or the like, the receptacle being provided with a discharge opening, a feed slide operating underneath the opening, a revoluble disk mounted underneath the slide and adapted to receive the material therefrom, a shaft on which the disk is mounted, a pinion mounted on said shaft and arranged for a clutch connection therewith, a rack bar meshing with said pinion, a lever connected to the slide and to the rack bar for the simultaneous reciprocation of the two, a tilting platform, a support therefor, and a link rod connection between said lever and platform.

In testimony whereof, we affix our signatures in presence of two witnesses.

WILLIAM A. KRAXBERGER. [L. S.]
HENRY J. LAKER. [L. S.]

Witnesses:
J. M. WILHITE,
B. J. JOHNSON.

---

Copies of this patent may be obtained for five cents each, by addressing the "Commissioner of Patents, Washington, D. C."